July 1, 1969 W. D. SCHAFER 3,453,383

ELECTRONIC PICTURE DISPLAY SYSTEM PERMITTING TRANSMISSION OF INFORMATION FROM CAMERA TO MONITOR THROUGH A NARROW BANDWIDTH DATA LINK

Filed Nov. 24, 1965 Sheet 1 of 2

3,453,383

ELECTRONIC PICTURE DISPLAY SYSTEM PERMITTING TRANSMISSION OF INFORMATION FROM CAMERA TO MONITOR THROUGH A NARROW BANDWIDTH DATA LINK

Walter Dale Schafer, Sydney, New South Wales, Australia, assignor to Solid State Electronics Pty. Limited, Bondi Junction, New South Wales, Australia Filed Nov. 24, 1965, Ser. No. 509,536
Claims priority, application Australia, Dec. 7, 1964, 52,570/64
Int. Cl. H04n 7/02, 3/16
U.S. Cl. 178—6.8 9 Claims

ABSTRACT OF THE DISCLOSURE

An electronic picture display system which provides for transmission of information from a television camera, of the type which produces conventional broad bandwidth television signals, to a television monitor, of the type which receives conventional broad bandwidth signals, by way of a narrow bandwidth data link.

This invention relates to an electronic picture display system adapted for use in special circumstances.

It is, of course, well known to employ closed circuit television apparatus which will give at the receiver a moving picture of what is seen by a camera at the transmitting station for a continuous display of a bulletin board or some similar static picture, upon which any change effected will be immediately transmitted.

While such systems are suitable for use where the transmitter and receiver are relatively close together, they are highly expensive if the transmitter and receiver are far apart (for example, several miles), owing to the need for co-axial cables or microwave radio links between the transmitter and receiver.

It is the object of the present invention to provide an electronic display system in which the signal can be transmitted over ordinary telephone lines or other connections of narrow bandwidth, and which shall be suitable for such uses as hereinafter outlined.

For many purposes it is not necessary to have a moving picture at the receiving station, nor one which shows any changes in the picture transmitted instantly. Moreover, in many such cases it is not necessary to have a shaded picture such as shown on an ordinary television screen. A picture wholly composed of black and white elements is sufficient, and indeed may be preferable for the sake of clarity.

As an example of the uses of such a system one may quote the transmission and display of information appearing upon market boards in a stock exchange, wool exchange or similar commercial establishment, or the transmission of account details and specimen signatures between branches of banks. Another field of use is to provide a visual accompaniment of documents, signatures and the like for Telex services.

In accordance with the present invention, an electronic picture display system comprises a television camera of the type which produces a conventional broad bandwidth television signal representative of successive frames of an image, at least one television monitor having a display tube and of the type which receives conventional broad bandwidth television signals, and means permitting transmission of information from said camera to said monitor(s) by way of a narrow bandwidth data link; said means comprising means to select samples at successive points along every line of successively scanned frames, one sample being selected from each line in each scanned frame, means to condition said samples to produce a resultant signal which is composed of pulses each of duration equivalent to at least one line period and which indicates a presence (or absence) of an information bit in each of said samples at said successive points, said pulses being delayed to the commencement of a line period subsequent to that in which an information bit occurs, means to integrate said resultant signal in order that it may be transmitted by way of said narrow bandwidth data link to a receiver, and, at said receiver, means to differentiate, condition and re-sample said resultant signal whereby information bits corresponding to those originally sampled are progressively fed to the display tube of said monitor(s) until at least a selected part of the camera image has been sampled and transmitted.

Preferably, the sample selecting means comprises a first sampling gate which opens and closes once on each line of each frame of the camera image, and the re-sampling means comprising a second sampling gate. The second sampling gate constitutes a coincidence amplifier which successively passes to the monitor only information bits corresponding with those bits in portions successively sampled by the first sampling gate.

A switching circuit may be incorporated in the transmitter to limit transmission of the field of view of the camera to a fraction only of said field, for example to enable the transmission to be concentrated on one line of the text viewed.

A great advantage of the system of the present invention is that the camera may be a standard television camera, and the monitor an ordinary television receiver with a special tube, the intervening link being an ordinary telephone line, so that only the scanning and other equipment hereinafter referred to at each end of the link is of special character.

A further advantage of the present system is that as an ordinary television camera is employed, this may be coupled to ordinary television receivers anywhere where a co-axial cable can be run, and thus, in the case of a stock exchange, for example, receivers co-axially coupled to the camera may display the information with full resolution, shading and immediate changes at monitors disposed at various points around the floor of the exchange or in nearby brokers' offices, while the more limited reproduction achieved by the system of the present invention is available in brokers' offices distant from the stock exchange or even in other cities.

At such receiving stations the viewer does not behold a complete picture of the market board nor necessarily see the alterations being written in thereon at the moment of writing. What he sees is a rectangular panel of black background down which each line of information from the bulletin board is successively displayed. Of course, the lines of information may be successively displayed upward from the bottom of the panel to the top, or be displayed in the form of vertical columns. Information viewed may also only constitute a small portion or narrow band of the whole of the information displayed on the bulletin board. Each line of the displayed information has considerable persistence but fades before recommencement of display of the same line of successively scanned frames. The effect is somewhat similar to that on a radar screen. Only true blacks and whites are transmitted, so that the image is bright, clear-cut and legible.

Indeed the latter features may be made use of by replacing the customary market boards in a stock exchange or similar location, with screens displaying the signals from the device of the invention magnified to a sufficient size. In that case what the camera views is a small screen whereon the information is written. For example, the small screen may be of clear glass illuminated from the edges and bearing printed information as to the name of the company concerned and the denominations of its shares (for example) with a space for writing in the current quotations by buyers and sellers and details of transactions recorded. The printing and also the hand-writing are effected in suitably pigmented inks which shine from the light within the screen.

Or the camera may view a sheet of paper or the like illuminated in any suitable manner.

The camera preferably electronically reverses the image if this is white on black so that a black on white image is transmitted, if required for best definition.

Also the camera and receiver preferably are reoriented by 90° to get a vertical scan, both being placed on their sides.

The sampling and coding device of the invention in effect changes the time-base of conventional television transmission, and means are provided for synchronizing the receipt of the signals transmitted on this slower time base.

Further features of the invention will be apparent from the following description of a preferred arrangement of equipment in accordance therewith which will now be given by way of example and by reference to the accompanying drawings, in which.

Figure 1:
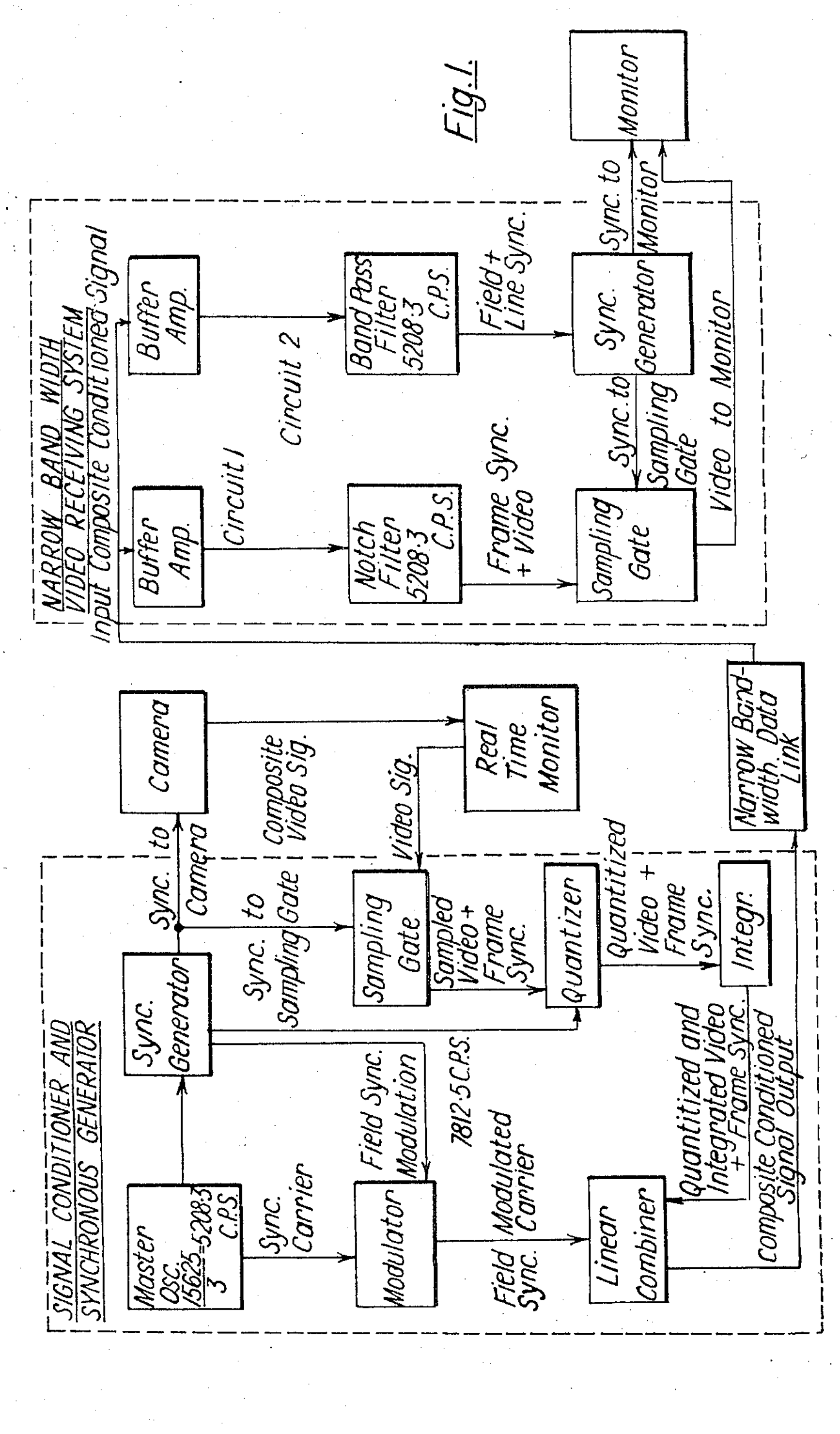
FIGURE 1 is a diagrammatic drawing which depicts such items of equipment and the connections between them. (The figures as to frequencies appearing thereon are for a camera viewing 625 lines per frame and viewing 25 frames per second.)

At the source end a television camera is trained on the desired area and its output is displayed on a conventional monitor or monitors. (This is a conventional television receiver but need not have the customary tuner, in the present example.) The video signal may be bridged through the monitor into a signal conditioning device. The signal conditioner samples, quantitizes, and integrates the signal.

The sampling gate samples the camera image. The quantitizer arbitrarily gives a black or white significance to each sample thereof. This quantitizing step makes line noise or other irregularities in transmission much less significant in their effect upon the finally displayed image. Sync information is added to the conditioned signal in the linear combiner (or signal mixer) and the signal then may be transmitted over a narrow band data link, such as a telephone line or a radio transmitter.

At the receiving end the composite, conditioned signal is fed into a device that reconstructs the sync and resamples the signal in two parallel circuits, as illustrated. The reconstructed sync and re-sampled signal are then fed together into a television monitor. The monitor is a conventional television receiver (with or without tuner) with the exception of the picture tube, which has an appropriate long persistence phosphor instead of the usual short persistence ones.

The image appears on the monitor screen as a band of illumination which travels up, down or across the face of the tube in a manner similar to some radar displays. The frame rate and the persistence of the phosphors are balanced to achieve effective erasure (through decay of phosphoresence) so that one complete frame will have been transmitted by the time the scan reaches any portion of the tube that it has previously traversed.

The camera and monitor may be re-oriented 90° to enable the scan to travel vertically instead of horizontally, which would be desirable for some forms of display.

Frame rates of 10 seconds/frame to 40 seconds/frame are easily achieved, along with maximum resolution in the direction of line scan of 250 to 1000 lines respectively.

The relationship between frame rates and resolution is derived from the following (assuming television standards of 625 lines per frame and 25 frames per second): Sampled bits per line/25=frame rate in seconds.

The relationship between horizontal resolution and the sampling rate is: Maximum lines of resolution in the direction of line scan=No. of bit samples per line.

The bandwidth occupied by the signal is: Lines per second/2=(1) maximum video signal frequency. Since the next lower possible (2) signal frequency is half the above, the sync carrier is inserted between (1) and (2). Specifically:

15625 c.p.s./2=7812.5 c.p.s. highest possible video frequency.

7812.5 c.p.s./2=3906.25 c.p.s. second highest possible video frequency.

15625 c.p.s./3=5208.33 c.p.s. sync carrier frequency.

Since the sync carrier is well removed from either of the video frequencies adjacent to it, a notch filter easily removes it from the conditioned video signal and a bandpass filter separates the video from the sync.

The output signal from the master oscillator, operating at one third of the line frequency, is fed into the sync generator. In the sync generator the signal is multiplied by a factor of three and the line sync is derived from it. The signal is then divided down to a 50 cycles per second rate and the field sync is derived from this. The field and line sync pulses are combined to furnish the sync for a television camera operating at the following standards:

Frame rate=50 fields per second
Frame rate=25 frames per second
Line interlace=2 to 1
Lines per frame=625

The signal from the television camera, consisting of video plus sync information, is fed to a conventional television monitor. The monitor (designated "Real Time Monitor") provides a conventional display of any picture or data.

The signal may be bridged through the monitor and fed into the "Sampling Gate." In the sampling gate the signal is sampled for a time period of approximately .000,000,068 second starting at the beginning of every line for two complete fields or one real time frame. At the end of the first frame the sampling is initiated 68 nanoseconds after the beginning of each line and the signal is again sampled for one complete frame, each sample having a duration of approximately 68 nanoseconds. On each succeeding frame the sampling is initiated 68 nanoseconds later, referenced to the beginning of each line. This process is continued until the lines have been sampled in their entirety.

The following is a specification of this sampling process:

Assuming Australian television standards. The time required to scan one line=$\frac{1}{15625}$ c.p.s.=.0000638 second or approximately 64 microseconds. The portion of this time occupied by blanking and retrace is approximately 20% or 12.8 microseconds.

Subtracting 12.8 from 64 yields the time occupied by the actual linear portion of one scanned line. Rounded off this becomes 51 microseconds.

Therefore:

Time required to scan one line=51 microseconds.
Assuming a required resolution of 750 lines maximum.
Number of samples desired of each line=750 samples/line.
Time duration of each sample=68 nanoseconds.
Time delay of each successive sample on any one line (i.e., a line composed of samples of every line for one real time frame), relative to the preceding sample=$\frac{1}{15625}$ sec.+68 nanosecs.

For acceptable operation it is not necessary to achieve exact coincidence between the time duration of each sample and the delay time of succeeding samples as above. The specifications should be regarded as an ideal rather than as a stringent requirement.

When all 625 lines have been sampled throughout their entire 51 microseconds linear duration, the sampling gate returns the sampling period to the beginning of the lines and the cycle is re-initiated. The times required for each of these sampled or slow-scan frames is the product of the bits or samples per line and the time required for one real time frame or: 25 frames/second rate=.040 sec./real time frame.

Therefore .040 sec.×750=30 seconds/sampled frame.

Since a sampled frame is made up of a multiple of real time frames, the sampling gate at the receiver must by synchronized with the sampling gate in the original signal conditioner. Both sampling gates normally are identical.

This signal (designated frame sync on the block diagram) for synchronizing the sampling gates is multiplexed with the video signal once every sampled time frame at the transmitting sampling gate and consists of an improbable pattern of consecutive black or white sample bits, which is transmitted for a period of at least one entire real time frame.

The frame sync as herein referred to constitutes a signal which is injected to synchronize operation of the sampling gate above mentioned and the sampling gate in the receiver to thus synchronize the transmitted and the received sampled time frames; the sampled time frame being the time required to scan the whole or a desired portion of the camera image.

The invention therefore includes a system of "virtual" transmission of two bit data (such as black/white), one bit of said data (e.g., black background of a display) being assumed while the other bit of said data (e.g., white intelligible information) is transmitted, both positive and negative pulses being regarded as identical data bits. Thus by transmitting, for example, only the "white" bit of said data, the bandwidth required for transmission of said data is reduced by a factor of two.

Figure 2:
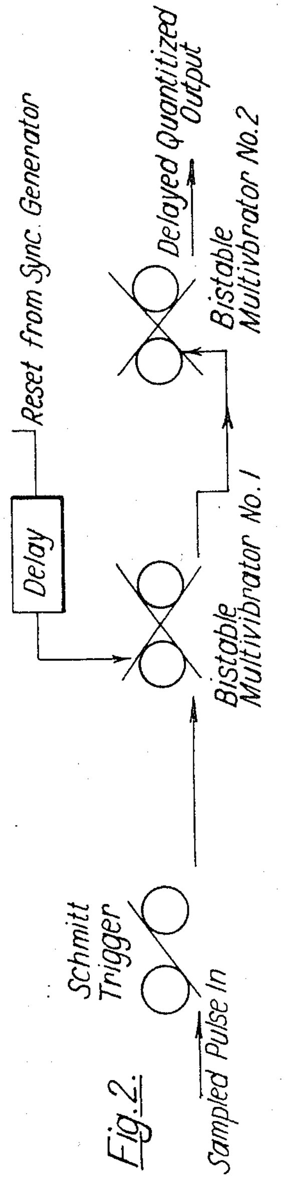
FIGURE 2 is a detailed circuit diagram of a quantitizer shown in FIGURE 1.

After the insertion of this sampled frame sync the video signal is quantized and integrated as follows, being also illustrated in FIGURE 2:

The sampling gate samples the video signal from the camera and the sampled pulses are fed to a Schmitt trigger, which fires specifically for predetermined level of pulses generated by black or white image fragments (according to its setting but not for both). This trigger quantizes the pulse and makes line noise or other irregularities in transmission much less significant in their effect.

The output from the Schmitt trigger is fed to a synchronous bistable multivibrator which is reset at the beginning of every line, i.e. at the end of the flyback period. Resetting occurs however only if a data bit occurs within the sampled portion, an output pulse then being generated.

The output pulse of the first bistable multivibrator is fed to a second bistable multivibrator which flip-flops to alternating conditions to provide output pulses responsive to output pulses from the first multivibrator. Thus an output pulse from the second multivibrator is generated responsive to resetting of the first multivibrator and is thereby initiated at the commencement of the line period immediately following that line period in which a data bit occurs. The output pulse from the second multivibrator is maintained until resetting of the first multivibrator again occurs, i.e., until the end of the next line period in which a further data bit of sufficient intensity level to actuate the Schmitt trigger occurs.

Thus, in quantizing the successive information bits (i.e., pulses corresponding to "white" only), successive pulses, each of duration equivalent to at least one line period but delayed to the commencement of the next line period to that in which the information bit occurs, are produced. Those portions of the scanned data which are black are not transmitted and are assumed black because of the absence of signal corresponding to white.

Figure 3:
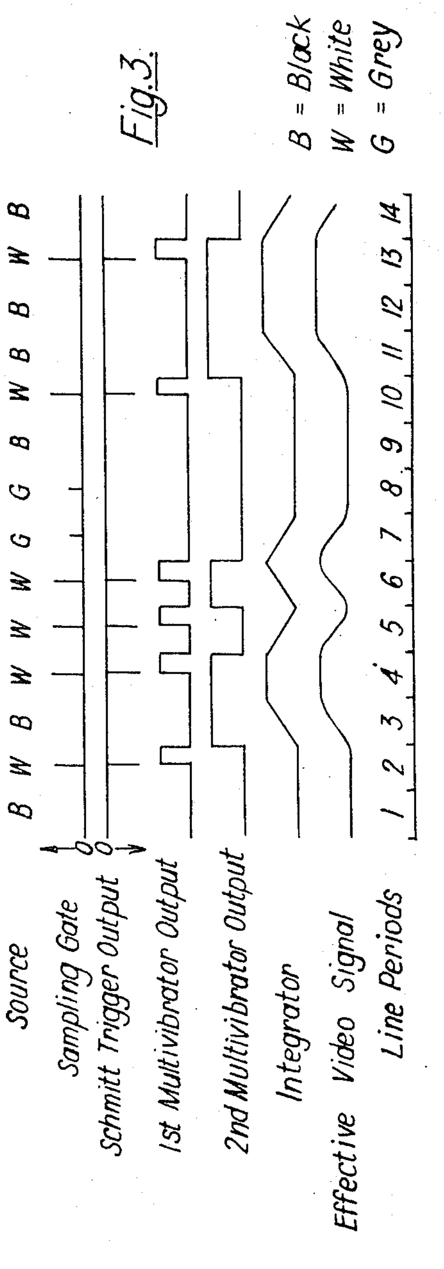
FIGURE 3 shows a diagrammatic analysis of quantitized and integrated wave forms and relative pulse timings for a selected (but incomplete) number of line periods.

The output of the second bistable multivibrator and its relationship to the first multivibrator output is shown in the wave diagram given in FIG. 3, which diagram indicates the transmission of pulses corresponding to white only.

The output of the second bistable multivibrator is then integrated and filtered to provide the effective video signal referred to in FIG. 3 and then linearly combined with the field modulated sync carrier. This signal, designated "composite conditioned signal" on the block diagram, may now be transmitted over a narrow band data link.

At the receiving end, two parallel buffer amplifiers are used to isolate the two following circuits from both the data link and each other. Filters are inserted in each circuit.

Referring to the diagram of the receiving system:

In circuit 1, a notch filter removes the sync carrier and side band from the video information.

In circuit 2, a band pass filter removes video information from around the sync carrier and side bands.

The sync carrier in circuit 2 is used as a primary oscillator in a signal generator and is multiplied up by a suitable factor before being fed to a standard sync generator for a television monitor.

The sync generator (normally identical with that in the transmitter, and certainly operating at the same frequency) supplies sync to the receiving monitor and to the receiving sampling gate.

In circuit 1 of the receiving system the signal is re-sampled, the video information is fed to a differentiator and then to a Schmitt trigger.

Output from the Schmitt trigger is fed to a synchronous bistable multivibrator which serves to delay the signal so that it commences at the commencement of the line period following that in which the signal is received, i.e., at the end of the fly-back period following its reception and lasts for the duration of that line period.

The output from the multivibrator (i.e., video) is then fed to the receiver sampling gate (which is identical with the sampling gate at the transmitting end) which samples the video, information bits of which are then fed to the receiving monitor. The monitor then reconstructs the image on its display tube and the process is complete.

I claim:

1. An electronic picture display system comprising television camera means for producing a broad bandwidth television signal representative of successive frames of an image, at least one television monitor means having a display tube for receiving broad bandwidth television signals, and means permitting transmission of information from said camera to said monitor by way of a narrow bandwidth data link; said means comprising means to select samples at successive points along every line of successively scanned frames, one sample being selected from each line in each scanned frame, means conditioned by said samples to produce a resultant signal which is composed of pulses each of duration equivalent to at least one line period and which indicates a presence or absence of an information bit in each of said samples at said successive points, said last named means delaying said pulses to the commencement of a line period subsequent to that in which an information bit occurs, means to integrate said resultant signal in order that it may be transmitted by way of said narrow bandwidth data link to a receiver, and, at said receiver, means to differentiate, condition and re-sample said resultant signal whereby information bits corresponding to those originally sampled are progressively fed to the display tube of said monitor until at least a selected part of the camera image has been sampled and transmitted.

2. An electronic picture display system as claimed in claim 1 wherein said sample selecting means comprises a first sampling gate which opens and closes once on each line of each frame of the camera image and wherein said re-sampling means comprises a second sampling gate, said second sampling gate constituting a coincidence amplifier which successively passes to the monitor only information bits corresponding with those bits in the portions successively sampled by the first sampling gate.

3. An electronic picture display system as claimed in claim 1 comprising a linear combiner and in which the resultant signal, after being integrated, is combined with a field modulated sync carrier in said linear combiner to provide a composite conditioned output signal.

4. An electronic picture display system as claimed in claim 3 comprising a signal generator and a standard sync generator associated with said monitor and in which, at the receiving end, the field modulated sync carrier is removed from said composite signal and the modulation is detected and used to provide primary oscillations in said signal generator, the primary oscillations then being fed to said standard sync generator associated with the monitor.

5. An electronic picture display system as claimed in claim 3 comprising filters and wherein the signal and the field modulated sync carrier together constituting the composite signal are separated by means of said filters.

6. An electronic picture display system as claimed in claim 1 in which said display tube incorporates phosphors having a decay time substantially corresponding to one sampled time frame.

7. An electronic picture display system as claimed in claim 1 in which the camera comprises means to reverse selectively the image black for white or white for black.

8. An electronic picture display system as claimed in claim 1 in which the camera and monitor are oriented to achieve vertical scanning.

9. An electronic picture display system for transmission of two bit data and as claimed in claim 1, one bit of said data being assumed while the other bit of said data is transmitted in the form of positive and negative going pulses, said positive and negative going pulses both being regarded as identical data bits.

References Cited

UNITED STATES PATENTS

| | | | |
|---|---|---|---|
| 2,829,199 | 4/1958 | Baracket et al. | 178—7.7 |
| 2,909,600 | 10/1959 | Becker | 178—6.8 |
| 2,955,159 | 10/1960 | Jones | 178—7.2 |
| 3,238,299 | 3/1966 | Lender | 178—68 |
| 3,284,567 | 11/1966 | Southworth | 178—6.8 |
| 3,294,896 | 12/1966 | Young | 178—5 |

ROBERT L. GRIFFIN, *Primary Examiner.*

RICHARD K. ECKERT, Jr., *Assistant Examiner.*

U.S. Cl. X.R.

178—7.1